United States Patent [19]
Bollini

[11] Patent Number: 6,059,305
[45] Date of Patent: May 9, 2000

[54] FREEWHEEL DRIVE DEVICE, PARTICULARLY FOR A BICYCLE

[75] Inventor: Jean Bollini, 3 Allée des Taillis, F-38640 Claix, France

[73] Assignee: Jean Bollini, Claix, France

[21] Appl. No.: 08/981,248

[22] PCT Filed: Jul. 1, 1996

[86] PCT No.: PCT/FR96/01015

§ 371 Date: Dec. 22, 1997

§ 102(e) Date: Dec. 22, 1997

[87] PCT Pub. No.: WO97/02149

PCT Pub. Date: Jan. 23, 1997

[30] Foreign Application Priority Data

Jun. 30, 1995 [FR] France ................... 95 08156

[51] Int. Cl.[7] ............................................. B62K 1/00
[52] U.S. Cl. ............................................. 280/281.1
[58] Field of Search .......................... 280/281.1, 259, 280/260.63; 192/64; 301/111, 105, 114–117, 110.5, 121, 124.01; 188/26

[56] References Cited

U.S. PATENT DOCUMENTS 4,567,978  2/1986  Butz ........................................ 192/64
5,301,778  4/1994  Haeussinger ........................... 192/64

FOREIGN PATENT DOCUMENTS

| 435289 | 7/1939 | Belgium . |
| 2 0-191710 | 8/1986 | European Pat. Off. . |
| 2-518461 | 6/1983 | France . |
| 1 2-618101 | 1/1989 | France . |
| U1 89-09765 | 10/1989 | Germany . |
| U1 92-18358 | 1/1994 | Germany . |
| U1 94-08910 | 7/1994 | Germany . |
| 2-145675 | 4/1985 | United Kingdom . |

*Primary Examiner*—Christopher P. Schwartz
*Assistant Examiner*—C. T. Bartz
*Attorney, Agent, or Firm*—Oliff & Berridge, PLC

[57] ABSTRACT

An drive device (10) of a bicycle wheel comprises a first sub-assembly (23) with a freewheel (14) secured to one of the frame mounting brackets (20), and a second sub-assembly (52) supporting the hub (12), which is supported by the other mounting bracket (18) by means of a tube (76). A first transmission sleeve (44) secured to the freewheel is designed to cooperate by insertable engagement with a second transmission member (72) fixed to the hub (12) to couple or uncouple the mechanical link between the freewheel (14) and the hub (12) when the second sub-assembly (52) is respectively fitted or removed. The wheel can thus be replaced leaving the drive freewheel (14), transmission chain and derailleur in place.

8 Claims, 7 Drawing Sheets

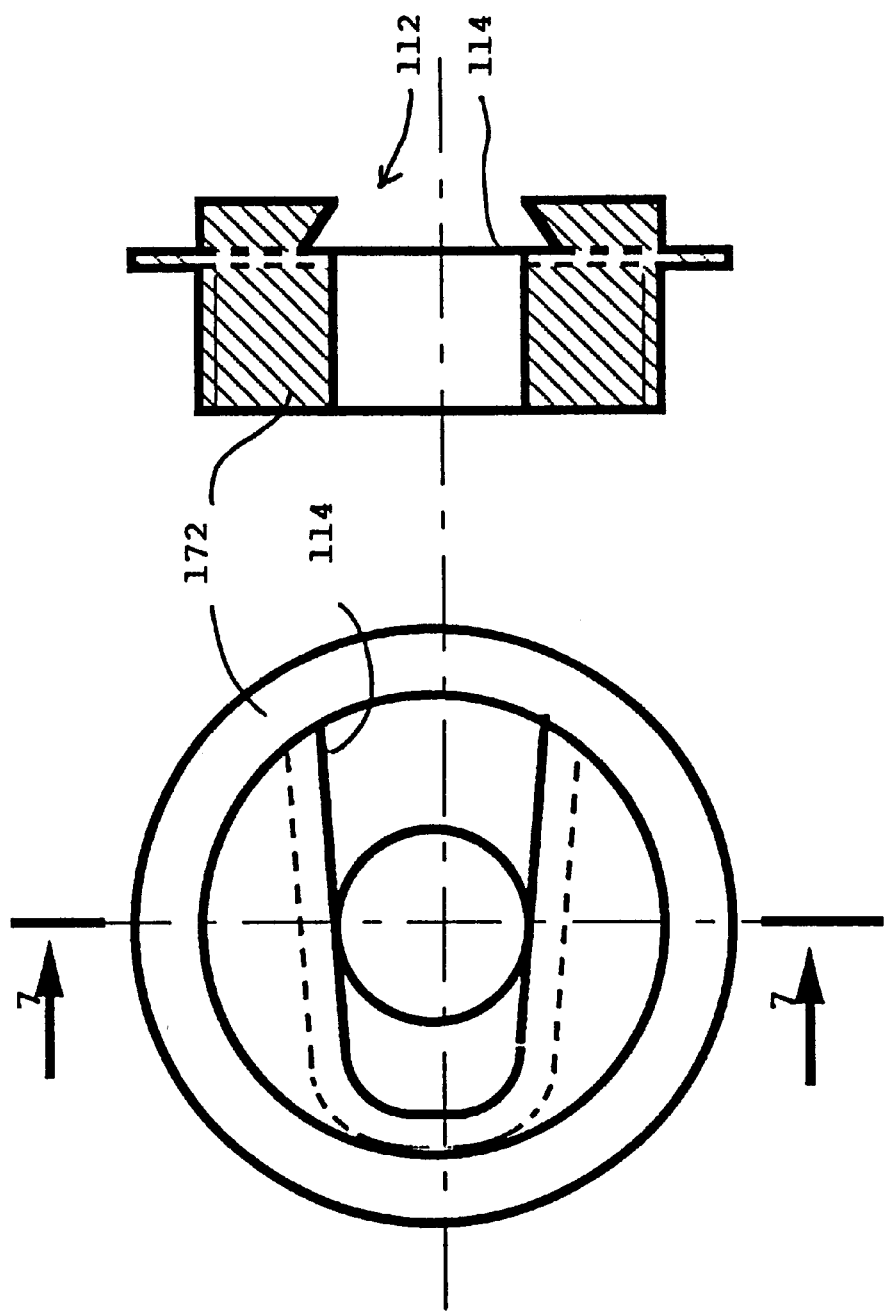

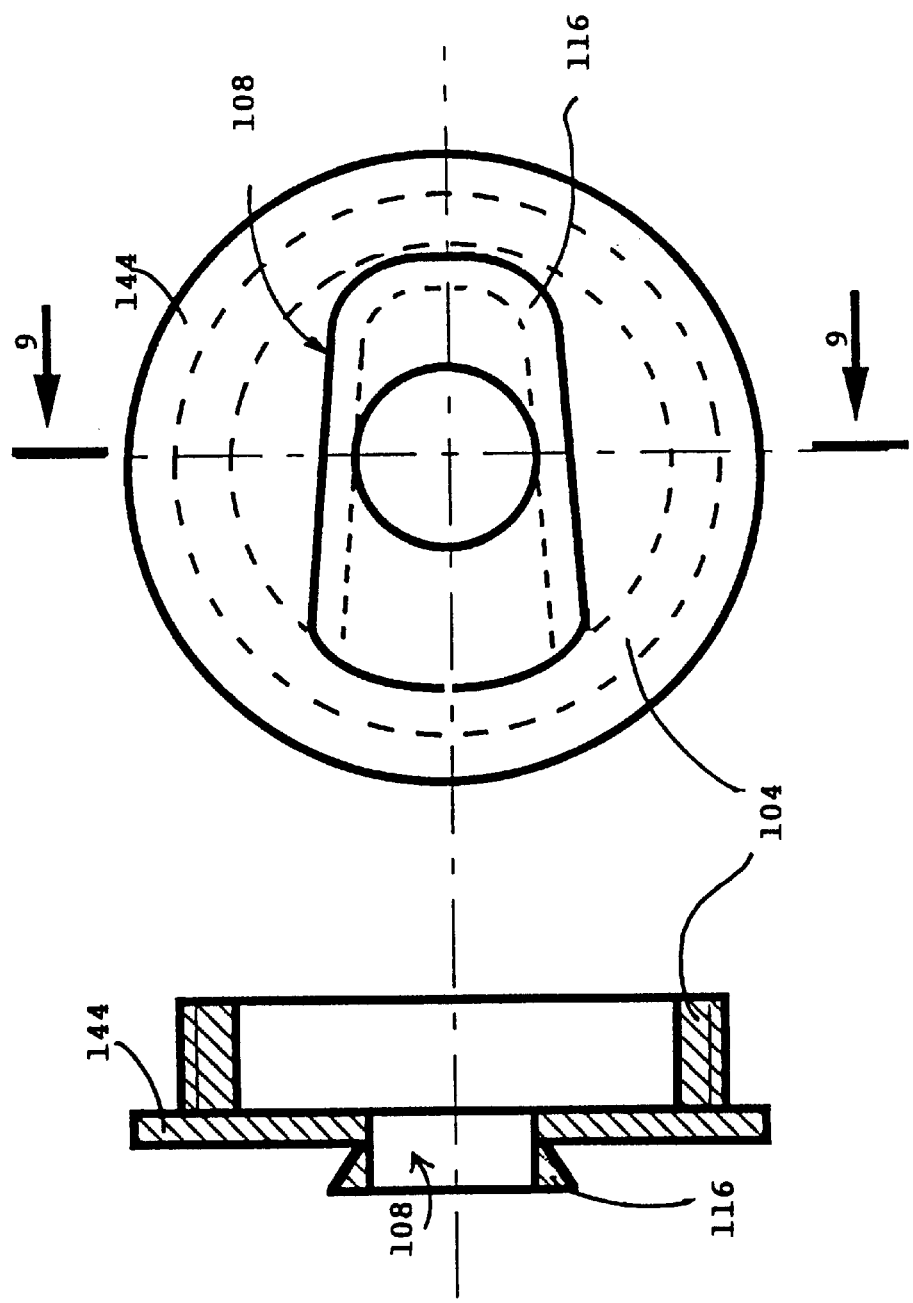

FREEWHEEL DRIVE DEVICE, PARTICULARLY FOR A BICYCLE

STATE OF THE ART

The invention relates to a cycle wheel drive device, particularly for a bicycle, comprising:
- a wheel support hub, which is arranged on a fixed tube by means of bearings to form a second sub-assembly supported by a frame mounting bracket,
- a freewheel for driving the hub, said freewheel being formed by an annular body mounted coaxially with respect to the axis of the hub, and comprising on the peripheral surface a series of cogs cooperating with a transmission chain, the body of the freewheel being mounted on a tubular support sleeve by means of a bearing to form a first sub-assembly secured to the other frame mounting bracket,
- and means for assembling the drive device to the frame mounting brackets.

On a traditional bicycle, the wheel support hub and the freewheel with cogs are mounted coaxially on a common axis, the ends of which are locked in apertures of the frame mounting brackets by securing nuts, for example butterfly nuts or eccentric nuts. In the event of a puncture, removing the rear wheel requires the nuts to be unscrewed followed by removal of the whole wheel with the freewheel, after the chain has previously been freed and the derailleur slackened. This known assembly of the hub and freewheel on the same axis is not practical in competition for, in the event of a puncture, the cyclist has to have available a spare wheel having a freewheel with the same cogs suited to his morphology and power. Another drawback is the complexity of fitting, as it requires putting the chain and derailleur back into place.

In professional cycling races, each rider chooses his own gearing corresponding to predetermined cogs of the freewheel. When a team leader has to change the rear wheel of his bike, a team member gives him his wheel, but the leader usually has to change this wheel again, because of the gearing which does not suit him.

In the device described in the document FR-A-2,618,101, the transmission between the freewheel and hub is performed by means of a link ratchet designed to be housed in blind holes machined in the flange. To remove the rear wheel, it is indispensable to unlock the ratchet beforehand by means of a tool. Quite apart from the problem of wear of the ratchet, such a device is complicated to achieve.

OBJECT OF THE INVENTION

The object of the invention is to be able to perform removal and replacement of a rear bicycle wheel easily, leaving the drive freewheel and transmission chain in place, and without having to slacken the derailleur.

The drive device according to the invention is characterized in that the body of the freewheel is equipped with a first transmission means cooperating by disengageable insertion with a second transmission means of the hub to couple or uncouple the mechanical link between the freewheel and the hub when the second sub-assembly is respectively fitted or removed.

According to one feature of the invention, the first and second transmission means comprise male and female transmission members of conjugate shapes, the engagement travel taking place perpendicularly to the axis of the wheel and in the direction of the grooves of the fixing brackets. The male and female transmission members are advantageously formed by tenons and slides with dovetailed cross-sections.

Removing the wheel requires prior extraction of the securing spindle following by uncoupling of the mechanical link achieved by a simple withdrawal movement, the travel of which corresponds to the length of the grooves arranged in the frame mounting brackets. The second sub-assembly of the hub is then dissociated from the first sub-assembly of the freewheel which remains in place on the associated mounting bracket.

According to another feature of the invention, the first sub-assembly comprises means for radial and axial positioning of the freewheel, respectively with respect to the support sleeve and to the internal face of the mounting bracket, and a binding nut screwed onto the sleeve against the external face of the mounting bracket.

The positioning means comprise;
- an adjusting nut screwed onto the sleeve between the internal face of the mounting bracket and the bearing,
- and a lock nut cooperating with the body to achieve both axial locking of the bearing against the adjusting nut and axial positioning of the end of the sleeve on the side where the first transmission means is located.

Other advantages and features will become more clearly apparent from the following description of an embodiment of the invention, given as a non-restrictive example only, and represented in the accompanying drawings, in which:

DESCRIPTION OF THE DRAWINGS

FIG. 6 shows a view according to the arrow 6 of FIG. 5, showing the female transmission member in the uncoupled position;

FIG. 7 is a sectional view along the line 7—7 of FIG. 6;

FIG. 8 represents a view according to the arrow 8 of FIG. 5, showing the male transmission member in the uncoupled position;

FIG. 9 is a sectional view along the line 9—9 of FIG. 8.

DESCRIPTION OF A PREFERRED EMBODIMENT

Figure 1:
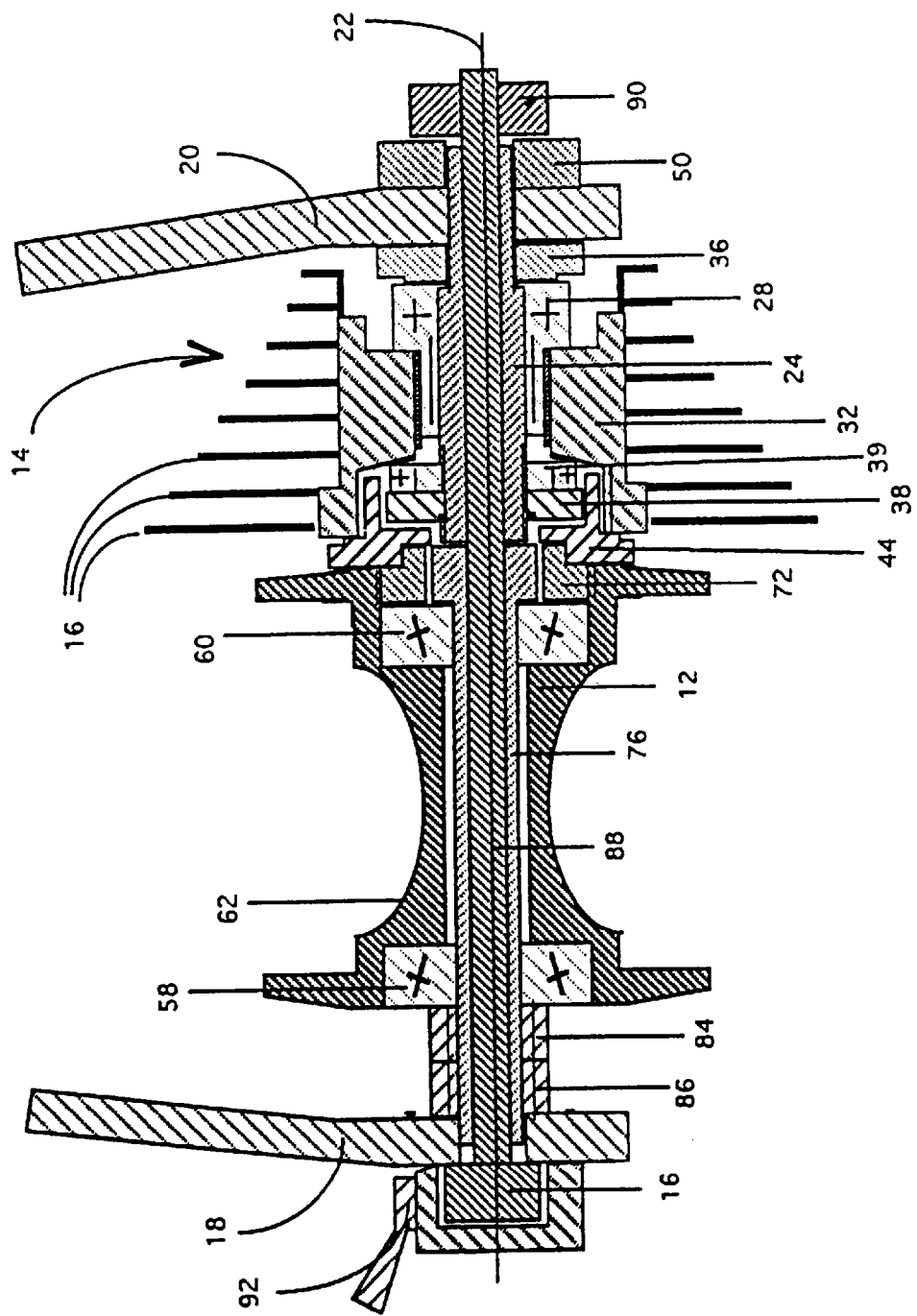
FIG. 1 is an axial sectional view of the according to the invention represented in the final assembly position.
Figure 2:
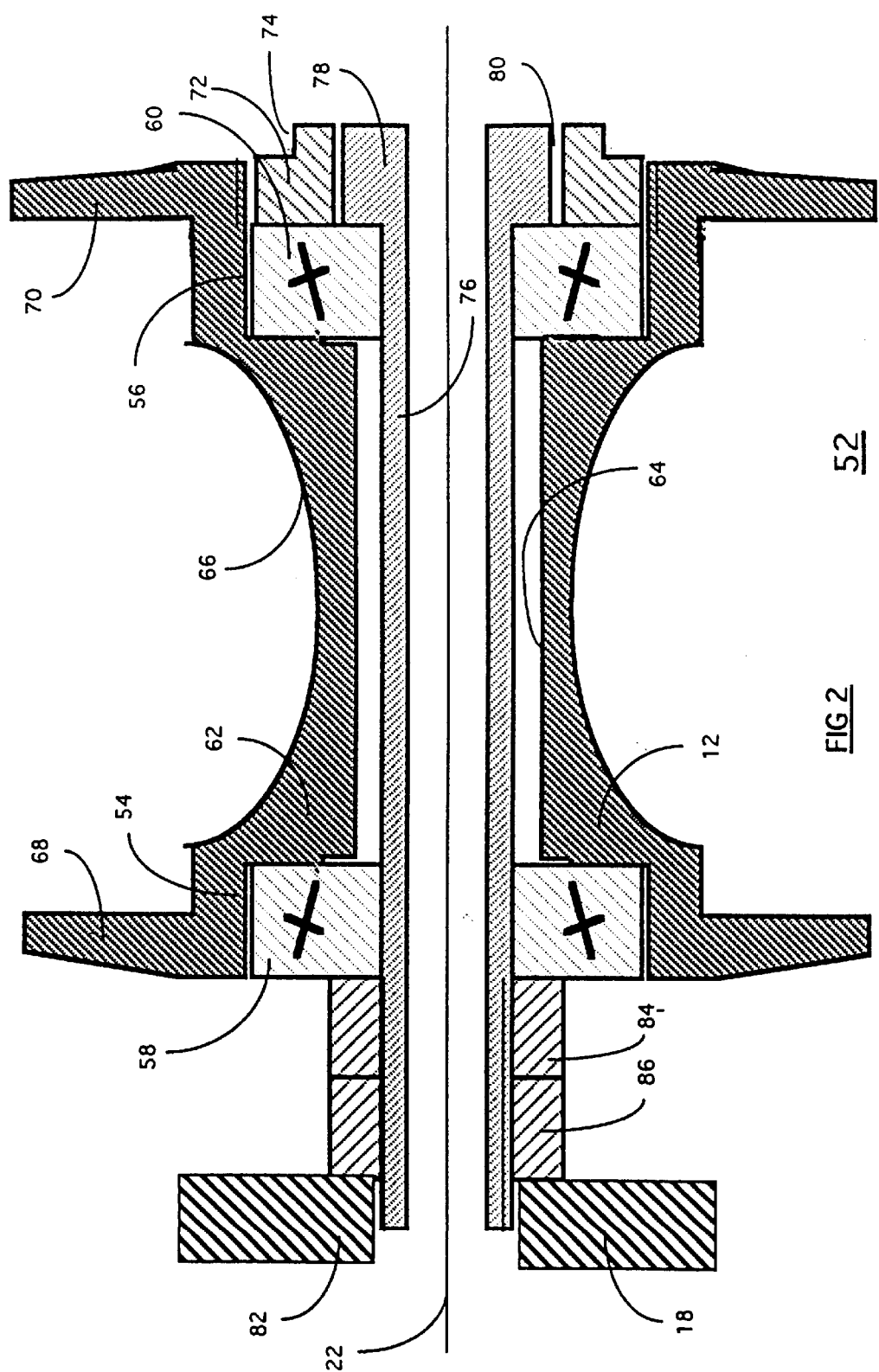
FIG. 2 is a partial view on an enlarged scale of FIG. 1, showing the hub support sub-assembly after the securing spindle has been removed.

In FIGS. 1 to 4, a drive device 10 of the drive rear wheel of a cycle comprises a hub 12 supporting the wheel and a freewheel 14 driving the hub 12. The freewheel 14 is equipped with a series of coaxial cogs 16 cooperating in conventional manner with a transmission chain (not represented) associated to a derailleur to change the driving speed.

The hub 12 and freewheel 14 are fitted between two fixing brackets 18, 20 of the frame with an axial alignment with respect to the transverse axis 22 of the wheel. Each bracket 18, 20 has a semi-open groove housing the end of the axis 22.

Figure 3:
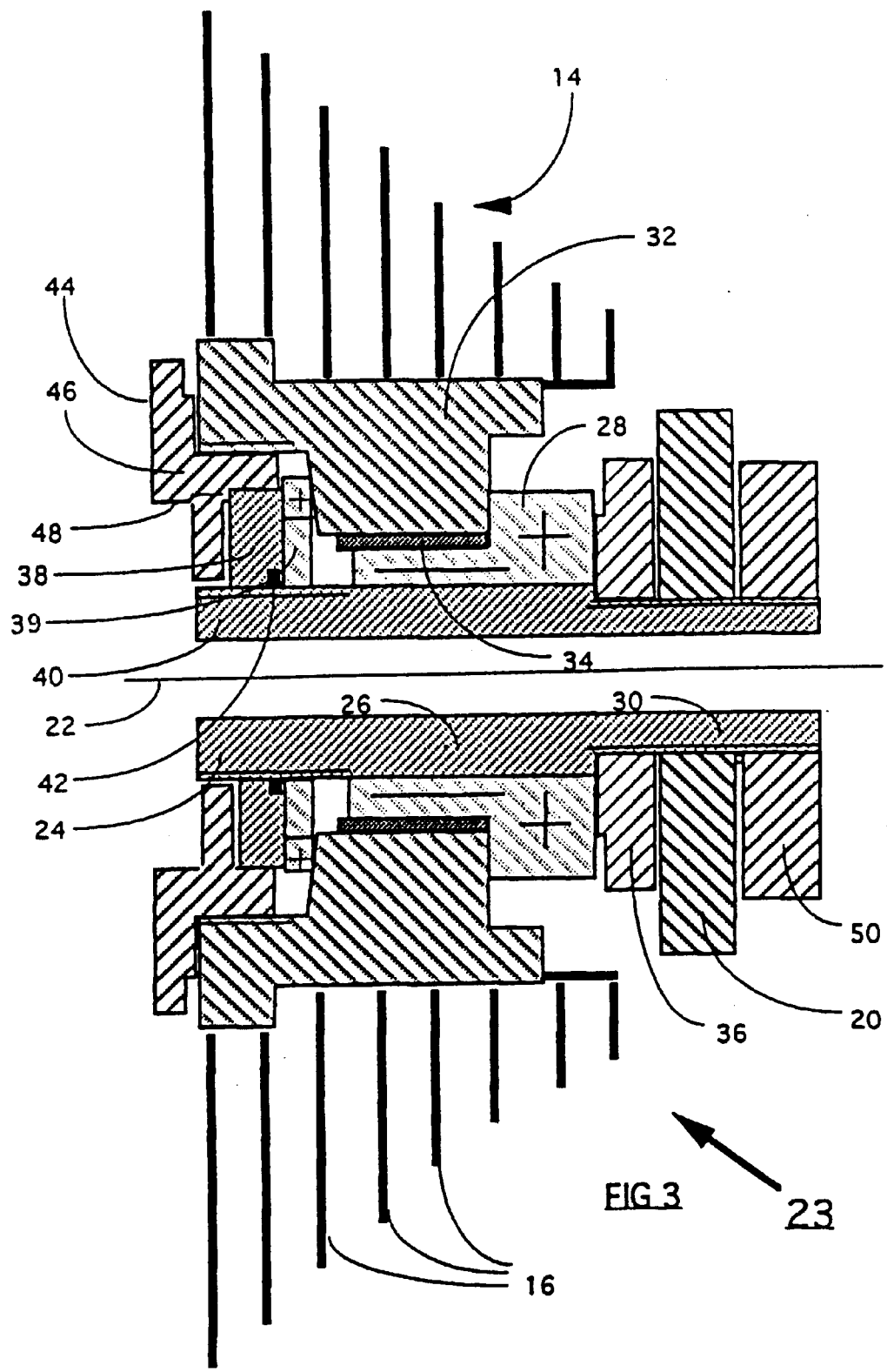
FIG. 3 is a partial view on an enlarged scale of FIG. 1, showing the other sub-assembly supporting the freewheel.

The drive freewheel 14 forms part of a first sub-assembly 23 represented in FIG. 3 and comprising a fixed support sleeve 24 of tubular shape having a first cylindrical portion 26 on which a combined needle bearing 28 is mounted and a second cylindrical portion 30 locking the first sub-assembly 23 on the right-hand mounting bracket 20. The freewheel 14 comprises an annular body 32 mounted internally on the bearing 28 and supporting the cogs 16 coaxially along its peripheral surface. An intermediate ring 34 can be fitted between the body 32 and the bearing 28 to take up the radial clearance. An adjusting nut 36 cooperates with the threaded part of the second portion 30 of the sleeve 24 to take up the axial clearance of the bearing 28 with respect to the internal face of the mounting bracket 20.

The metallic sleeve 24 is made of steel having a predetermined hardness suited to the rolling effect of the needles when rotation of the bearing 28 takes place generated by the drive freewheel 14.

Opposite the adjusting nut 36 there is fitted a lock nut 38 screwed onto the threaded part of the first portion 26 of the sleeve 24 and cooperating with a needle stop 39 pressing against a shoulder of the body 32 to perform both axial locking of the bearing 28 pressed up against the adjusting nut 36 and axial positioning of the end 40 of the sleeve 24 on the transmission side. A stop joint 42 is associated to the lock nut 38 to cause immobilisation in rotation when adjustment is carried out. The needle bearing 39 is single effect and is associated to a counterplate.

A first transmission means 44 secured to the freewheel 14 is formed by a coupling sleeve 46 fixed by screwing onto the body 32, and protruding out from the internal front face of the freewheel 14. The coupling sleeve 46 is provided with a female slide 48 protruding outwards with respect to the end 40 of the sleeve 24.

After the coupling sleeve 46 and nuts 36, 38 have been fitted, the first sub-assembly 23 is operational and can be fitted onto the mounting bracket 20 by means of a binding nut 50 which is screwed on the external side onto the second portion 30 of the sleeve 24 opposite the adjusting nut 36.

In FIG. 3, the first sub-assembly 23 is mounted fixed overhanging the mounting bracket 20 and is ready to receive the adjacent second sub-assembly 52.

The second sub-assembly 52 is provided with the wheel support hub 12 having at its opposite ends two annular housings 54, 56 receiving ball-bearings 58, 60, on each side of a tubular intermediate base 62, the internal diameter of whose bore 64 is smaller than that of the housings 54, 56. The periphery of the hub 12 comprises an appreciably curved central surface 66, notably of ellipsoid shape, situated between two shoulders 68, 70 acting as support for the spokes of the wheel. Each ball-bearing 58, 60 comprises a row of oblique contact ball-bearings, but it is clear that any other type of bearing may be used.

A second transmission means 72 of the male type is screwed coaxially into the housing 56 of the hub 12, coming into engagement against the bearing 60. This second transmission means 72 comprises a male slide 74 of conjugate shape 74 to the female slide 48 of the first transmission means 44.

The hub 12 is fixed to the left-hand mounting bracket 18 by means of a fixed metallic tube 76 having an elongate shape, of cylindrical cross section, passing axially through the bearings 58, 60 and the central surface 62. A shoulder 78 of the tube 76 presses against the bearing 60 and is separated from the second transmission means 72 by a radial clearance 80 allowing rotation of the hub 12 with respect to the fixed tube 76.

Opposite the shoulder 78, the end of the tube 78 is partially engaged in an orifice 82 of the bracket 18. Tightening of the bearings 58, 60 is achieved by means of a securing nut 84 designed to be screwed onto a threaded part of the tube 78. A counter nut 86 is fitted between the securing nut 84 and the internal face of the mounting bracket 18.

Figure 4:
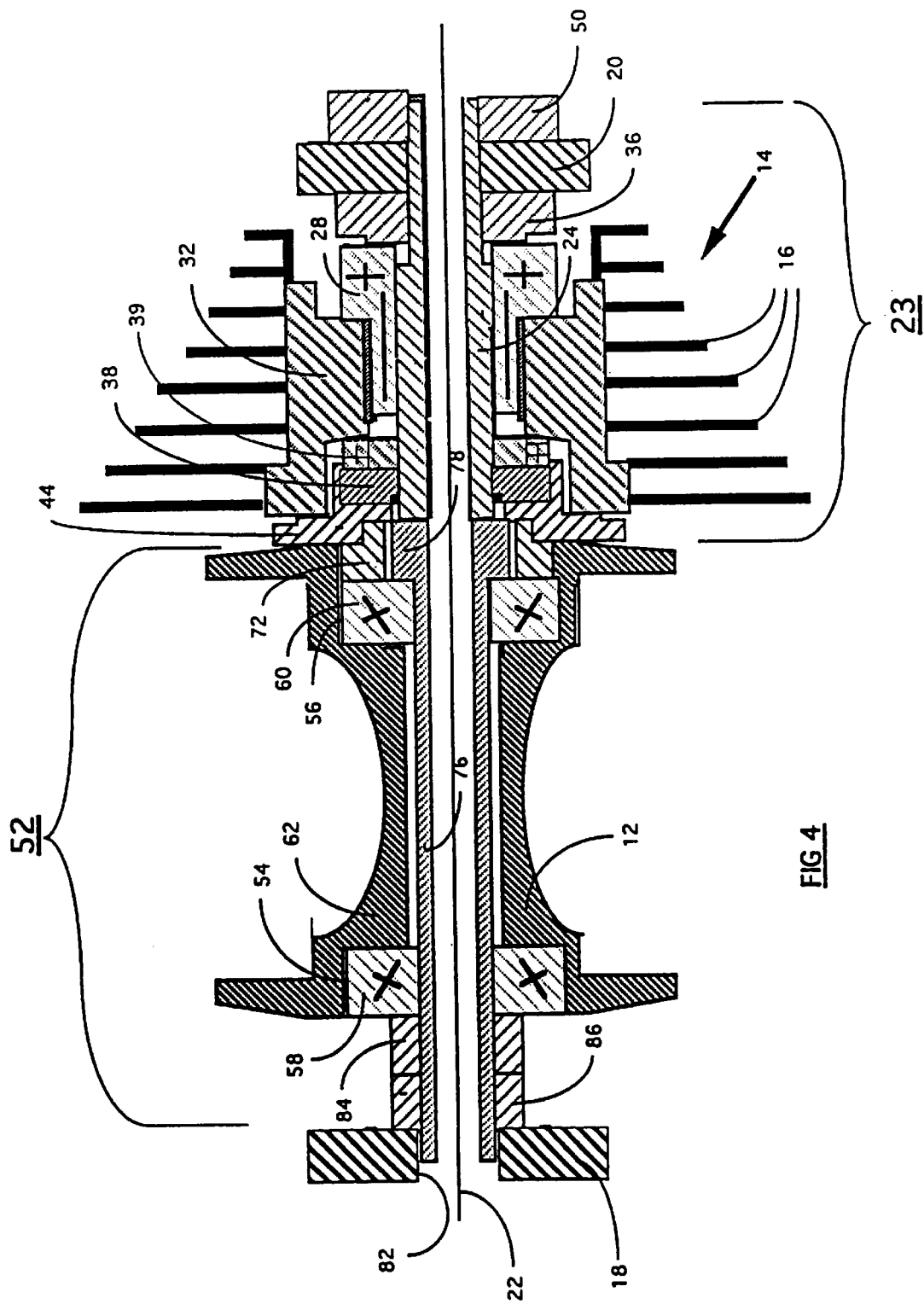
FIG. 4 is a sectional view after the two sub-assemblies of FIGS. 2 and 3 have been assembled, but before the securing spindle is fitted.

In FIG. 4, fitting of the wheel is achieved by inserting the second sub-assembly 52 between the coupling sleeve 46 of the first sub-assembly 23 and the mounting bracket 18, followed by engagement of the two transmission means 44, 72 and insertion of the tube 76 in the orifice 82 of the mounting bracket 18. The tube 76 of the second sub-assembly 52 and the sleeve 24 of the first sub-assembly 23 are then appreciably in abutment and in axial alignment, with direct coupling of the two transmission means 44, 72.

With reference to FIG. 1, final securing of the wheel is then achieved by means of a securing spindle 88 passing through the tube 76 and sleeve 24 along the transverse direction of the axis 22. The right-hand end of the spindle 88 is tightened manually on the side where the mounting bracket 20 is situated with a fast binding nut 90, whereas the left-hand end is secured on the side where the opposite bracket 18 is situated by means of a quick fixing device 92, for example with an eccentric handle.

Removal and replacement of the wheel are performed in the reverse order, after the securing spindle 88 has been removed. The mechanical link between the two transmission means 44, 72 simply has to be interrupted by a simple withdrawal movement causing disengagement of the male slide 74. The second sub-assembly 52 with the wheel can easily be removed, whereas the first sub-assembly 23 of the freewheel 14 remains in place on the mounting bracket 20. The withdrawal movement to uncouple the mechanical link takes place in the direction of extension of the grooves of the frame mounting brackets 18, 20.

Interruption of the mechanical coupling between the two transmission means 44, 72 of the two sub-assemblies 23, 52 makes fitting and removal of the wheel easier, leaving the drive freewheel 14 and the transmission chain in place and without having to slacken the derailleur or move the mounting brackets 18, 20 apart.

It is clear that the adjusting means for axial and radial positioning of the different parts of the transmission device 10 can be arranged differently without departing from the scope of the invention. The male and female transmission means 44, 72 can also be achieved by other insertably engageable mechanical links, or sliding assemblies with prismatic slides.

Figure 5:
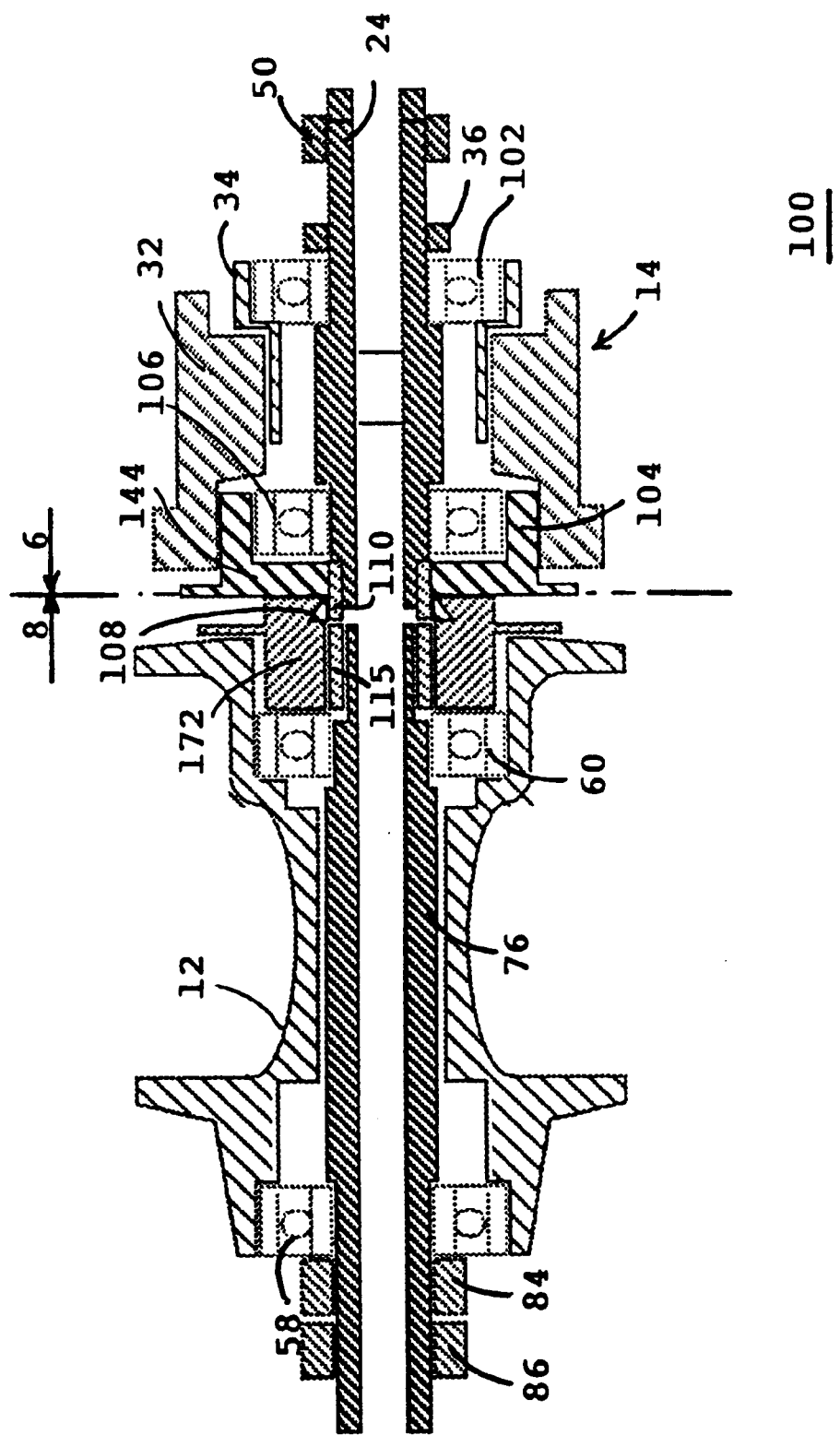
FIG. 5 is an identical view to that of FIG. 1 of an alternative embodiment.

In the alternative embodiment of the drive device 100 of FIG. 5, the same reference numbers will be used to designate identical or similar parts to those of the device 10 of FIG. 1. The male and female transmission means have been inverted and the combined needle bearing 28 has been replaced by a standard first ball-bearing 102 associated to the intermediate ring 34 to adapt the body 32 of the freewheel 14 to the external diameter of the bearing 102. The first transmission means 144 comprise an annular protuberance 104 which engages insertably on the external housing of the second bearing 106, and bearing on the opposite side the male transmission member 108, which will be described further on with reference to FIGS. 8 and 9. A first fixing ring 110 is screwed onto the end of the support sleeve 24 for axial positioning of the bearing 106.

The second transmission means 172 associated to the hub 12 supports the female transmission member 112, represented in detail in FIGS. 6 and 7, and comprising a semi-open slide, with a cross section in the form of an increasing dovetail. The annular periphery is threaded so as to be secured to the hub by screwing. A second fixing ring 115 is screwed onto the end of the tube 76 for axial positioning of the bearing 60.

In FIGS. 8 and 9, the male transmission member 108 is formed by a tenon 116 of conjugate shape to that of the slide 114. Insertion of the tenon 116 in the slide 114 is achieved by a simple engagement movement directed perpendicularly to the axis 22 of the hub 12 and in the direction of the grooves of the mounting brackets 18, 20. The engagement travel corresponds appreciably to the length of the grooves of the mounting brackets 18, 20.

What is claimed is:

1. A drive device of a drive wheel of a cycle, comprising:
    a wheel support hub, which is arranged on a fixed tube by means of bearings to form a second sub-assembly supported by a first frame mounting bracket;
    a freewheel for driving the wheel support hub, said freewheel being formed by an annular body mounted coaxially with respect to the axis of the wheel support hub, and comprising on the peripheral surface a series of cogs cooperating with a transmission chain, the annular body of the freewheel being mounted on a tubular support sleeve by means of a bearing to form a first sub-assembly secured to a second frame mounting bracket,
    and means for assembling the drive device to the first frame mounting bracket and the second frame mounting bracket,
    characterized in that the annular body of the freewheel is equipped with a first transmission means cooperating by disengageable insertion with a second transmission means of the wheel support hub to couple or uncouple the mechanical link between the freewheel and the wheel support hub when the second sub-assembly is respectively fitted or removed, the first and second transmission means comprising male and female transmission members of conjugate shapes, wherein the engagement or uncoupling travel takes place perpendicularly to the axis of the wheel and in the direction of a plurality of grooves of the first frame mounting bracket and second frame mounting bracket, and without pushing apart the first frame mounting bracket and second frame mounting bracket.

2. The drive device according to claim 1, characterized in that the male and female transmission members are formed by tenons and slides with dovetailed cross sections.

3. The drive device according to claim 2, characterized in that the female transmission member comprises a semi-open slide of increasing cross-section in the direction of disengagement corresponding to uncoupling of the mechanical link.

4. The drive device according to claim 1, characterized in that the tube of the second sub-assembly and the tubular support sleeve of the first sub-assembly are in axial alignment when the first transmission means and the second transmission means are in the coupled position, a securing spindle passing through the tube and sleeve for final locking of the wheel.

5. The drive device according to claim 1, characterized in that the first sub-assembly comprises means for radial and axial positioning of the freewheel respectively with respect to the tubular support sleeve and to the internal face of the second frame mounting bracket, and a binding nut screwed onto the tubular support sleeve against the external face of the second frame mounting bracket.

6. The drive device according to claim 5, characterized in that the positioning means comprise
    an adjusting nut screwed onto the sleeve between the internal face of the second frame mounting bracket and the bearing,
    and a lock nut cooperating with the annular body by means of a bearing component to achieve both axial locking of the bearing against the adjusting nut and axial positioning of the end of the tubular support sleeve on the side where the first transmission means is located.

7. The drive device according to claim 1, characterized in that the fixed tube of the second sub-assembly is equipped with a shoulder pressing against the bearing, said shoulder being separated from the second transmission means by a radial clearance allowing rotation of the wheel support hub with respect to the fixed tube.

8. The drive device according to claim 1, characterized in that an intermediate adapter ring is inserted between a first ball-bearing and the annular body of the freewheel, axial positioning of the second ball-bearing being performed by a first fixing ring screwed onto the end of the support sleeve.

* * * * *